ROY G. HLAVACEK
THOMAS R. SCHREUDER
INVENTORS.

March 15, 1966    T. R. SCHREUDER ETAL    3,240,146
CONTROLS FOR HAM PUMPING

Filed Nov. 20, 1962    3 Sheets-Sheet 3

ROY G. HLAVACEK
THOMAS R. SCHREUDER
INVENTORS.

BY
ATTORNEY.

3,240,146
CONTROLS FOR HAM PUMPING
Thomas R. Schreuder, South Holland, and Roy G. Hlavacek, Chicago, Ill., assignors to Swift & Company, Chicago, Ill., a corporation of Illinois
Filed Nov. 20, 1962, Ser. No. 239,013
5 Claims. (Cl. 99—256)

The present invention relates to an apparatus for controlling the amount of a material added to a given item as a function of the initial weight of the item. More specifically, this invention is an improved scale type apparatus for use in controlling the amount of liquid pickle solution, or the like, to be added to a cut of meat such as a ham.

It is the practice in the packing industry to pump liquid pickle, or curing material, into cuts of meat in an amount determined by the initial or "green" weight of the cut of meat. For example, in the processing of hams, a ham is weighed, hollow needles or other liquid delivery means are connected with veins in the butt end of the ham, and an amount of pickle is pumped therethrough into the ham. The amount, by weight, of pickle injected will be a predetermined percentage of the initial weight of the hams. Often this amounts to about 10% of the "green" weight.

Several automatic scales and scale attachments have heretofore been devised for performing this operation. For the most part, the prior devices have been expensive and complicated and have not been adaptable to weighing equipment already employed by a processor. However, one prior apparatus described in the Zillie Patent No. 2,812,705, has to a great extent overcome these disadvantages. The present invention is an improvement on the apparatus of the aforementioned patent, the disclosure of which is included herein by reference.

The aforementioned patented apparatus has been found to be limited in operation to a relatively narrow weight range of product. That is, due to the configuration of its elements, the prior control device will accurately regulate injected pickle to a desired percentage of the product weight only where the items of product initially are within a relatively narrow weight range, for instance, 8–10 pound hams. Outside of the particular range inherent in a given apparatus, more or less than the desired amount of pickle will be injected. It is believed that this error is due to the particular scale control linkages employed which do not move as a true linear function of the weight of product on the scale. Additionally, arcuate or tangential motion of the linkages employed in the prior apparatus introduce an error.

Accordingly, it is the principal object of the present invention to improve the accuracy of such scale controls over the entire range of possible weights of product and for a broad range of fractional amounts of material to be added to such product.

Another object of the present invention is to provide a device which may be incorporated into a scale, either at the time that the scale is manufactured or as an attachment to an existing scale, which is simple and low in cost and accurate throughout a wide range of product weight.

It is a further object of the present invention to provide a ham pumping control apparatus which is simple in construction and may be easily maintained and serviced by a mechanic.

The present invention basically involves the modification of a standard scale apparatus wherein one scale member moves downwardly in given units of distance per unit of weight of product placed thereon, and another element moves in another direction in proportionally greater increments of distance. Such scale devices are commercially available and are modified in accordance with the present invention to carry a pivotally supported control member on the downwardly moving scale element; and connecting a free end of the pivotally mounted means to move downwardly in accordance with the upwardly moving scale element. Locking means are provided to hold the pivotally mounted member at a position attained upon the scale reaching equilibrium, whereat vertical distances between the pivotally mounted member and the downwardly moving scale element will represent given percentags of the product being weighed. Additionally, electrical contact members are mounted upon the last mentioned means and element and connected to control material adding means.

Further objects and advantages of the present invention will become apparent from the following description taken in conjunction with the drawings wherein.

Figure 1:
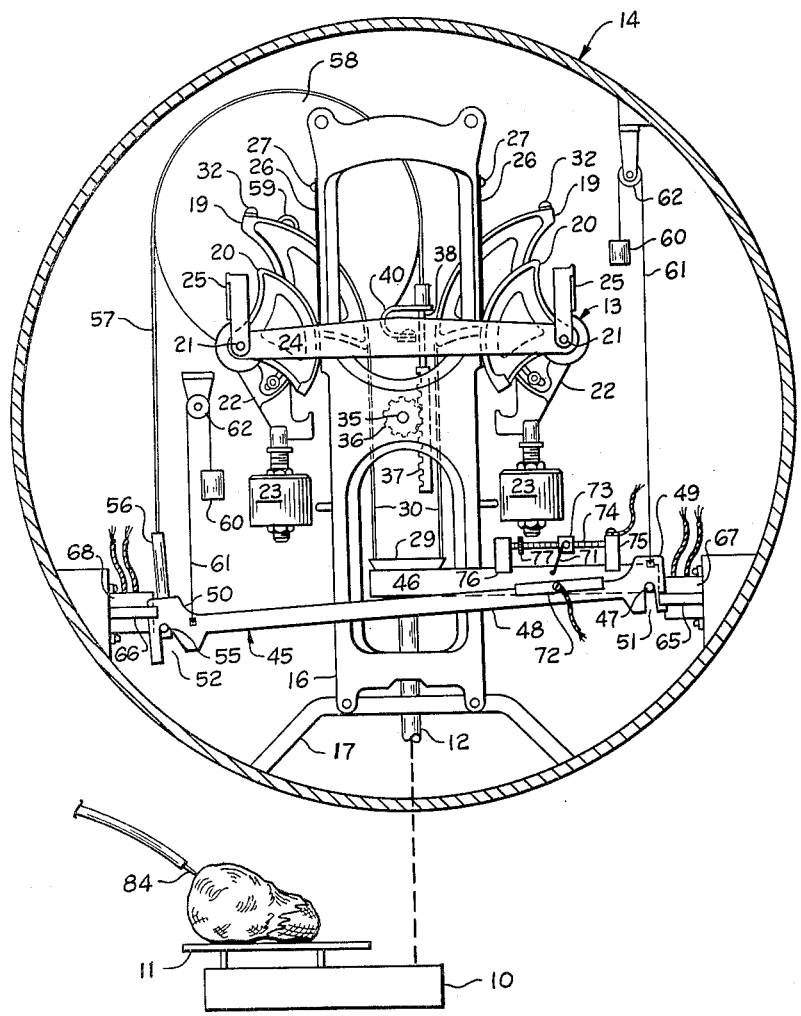
FIGURE 1 is an elevation view of the preferred embodiment of the present invention.

The scale mechanism illustrated in FIGURE 1 is of a type commonly known as a floating balance scale. Such a scale is produced by the Toledo Scale Company and identified as a Toledo 31–0850 type scale. Illustrated diagrammatically in FIGURE 1 is a lower case 10, which houses the lever mechanism on which is carried a platform 11 for supporting the product while being weighed. A ham is shown on the platform. The lever mechanism within case 10 is connected by a rod 12 to a floating balance generally 13 mounted within a cylindrical housing generally 14, which forms a frame for the balance and the elements of the present invention. Rod 12 is moved a given distance downward for each increment of weight placed on the platform 11. The rod 12 extends upwardly within the housing 14 into a central column 16, sometimes designated a sector guide, which is attached to the case at the top thereof and to the bottom through a mounting bracket 17.

The floating balance 13 comprises a pair of oppositely mounted power sectors 19 and fulcrum sectors 20, each attached to pins identified as 21. Similarly, attached to the pins 21 are arms 22 on which are mounted counterweights 23. As is well known in the art, this mounting of counterweights 23 involves various adjustable features so as to permit calibration of the scale. It will be noted in FIGURE 1 that the sectors and counterbalance structure are duplicated on each side of the sector guide 16, with the pins 21 on each side being connected by a pair of compensating bars 24 in which the pins 21 are journaled. Yokes 25 are connected between the two ends of each pin 21.

The balance 13 is supported by fulcrum sector ribbons 26 attached at one end to the sector guide 16 by means of screws 27 and attached at the other end by screws to the fulcrum sectors 20. The fulcrum sectors ride against the sides of the sector guides 16 with the sector ribbons 26 being interposed therebetween. On the upper end of rod 12 is a ribbon connection yoke 29 to which is secured a pair of power ribbons 30 by means of bolts. The other end of the ribbons 30 are secured to the power sectors 19 by means of screws 32. As will hereinafter be explained, the yoke 29 is modified from the form found in the commercial scale in the present invention.

A shaft 35 is suitably journaled in the housing 14 with one end of the shaft carrying a pointer, not shown, traveling about the weight indications on a dial, also not shown. A pinion 36 is also secured to the shaft 35 and is engaged by a rack 37 attached to the end of a rod 38. The rack 37 is mounted in suitable guides, not shown. A member 40 is secured between the compensating bars 24, and the rod 38. The movement of the scale is such that the rack 37 and rod 38 move upward a proportionally greater distance than the rod 12 is lowered when a given item is placed on the platform 11.

The scale thus far described, with the exception of yoke 29, is a standard scale structure. The present invention resides in a novel control lever generally 45 that is pivotally supported from the yoke 29, and electrical control contacts associated therewith for controlling the amount of material added to an item supported on a platform 11.

The ribbon yoke 29, which is mounted on shaft 12, is modified to carry a horizontally extended bar 46 which is directed toward one side of the scale (to the right side, as illustrated in FIGURE 1). A pivot pin 47 is secured to the extreme end of the bar 46 from rod 12. The control lever 45 comprises a flat center section 48 terminating in shoes 49, 50 at each end thereof. The shoes extend above and below the center section 48 and contain slots 51, 52, respectively, extending from the bottom of each shoe upward to the level of the top of the flat center section 48. As may be seen in FIGURE 1, the control lever generally 45 is thus pivotally supported upon pin 47 which extends through the slot 51 at a level in line with the upper surface of the center section 48 of the lever. Thus, the pivoted end of lever 45 will be raised and lowered according to the movement of rod 12 and yoke 29.

The opposite end of the control lever generally 45 normally rests upon a support pin 55 which is secured to the lower end of a vertically free-hanging member 56. The upper end of the latter member is attached to a flexible cable 57 which, in turn, is trained about a sheave 58 and connected, at the other end, to the upper end of rod 38 extending from the rack 37. The sheave 58, in turn, is rotatably mounted upon a stub shaft 59 which is anchored to the scale housing 14.

As may also be noted in FIGURE 1, both ends of the control lever generally 45 are counterbalanced by a pair of counterweights 60 which are connected to the control lever by cords 61 trained about pulleys 62 which are also supported on the scale housing 14. Thus, a very small portion of the weight of the control lever generally 45 is actually supported upon the pivot pin 47 and support pin 55. However, sufficient weight is exerted downwardly so that the control lever will normally descend at both ends with the respective pins.

Each shoe 49, 50 of the control lever generally 45 is normally slidable within clamp members 65, 66, respectively. The clamp members are supported within the scale housing 14 and are movable to grip the respective shoes by a pair of solenoids 67, 68 which are energized upon the command of an operator, as will later be explained.

The bar 46 and lever 45 support cooperating contact means to indicate the point at which the desired percentage of material is added to the item on the scale. An electrical contact finger 71 is adjustably supported upon the bar 46 extended from yoke 29. A cooperating electrical contact strip 72 is provided on the upper surface of the control lever center section 48 in an area engagable by the contact finger 71. The contact finger is made adjustable by mounting upon a captive nut 73 which rides on a threaded rod 74 journaled in a pair of pillow blocks 75, 76. An operator may adjust the position of the contact finger 71 by turning a knurled barrel 77 on the threaded rod 74.

The operation of the present invention is similar to that of the device disclosed in Patent No. 2,812,750. When an item such as a ham is placed upon the platform 11 of the scale, the yoke 29 and extended arm 46 will move downwardly in accordance with the weight of the item.

At the same time, the rack 37 and rod 38 move upwardly permitting the far end of the control lever 45 to be lowered by movement of the flexible cable 57. Since the upward movement of the rack 37 is greater than the downward movement of yoke 29, the left side of the control lever 45 will be lowered simultaneously with the extended bar 46. Thus, the control lever will pivot about the pin 47 on bar 46. In this position, the vertical distance between points on the bar 46 and on the center section 48 of the control lever will represent certain percentages of the movement of yoke 29 and, thus, of the weight on platform 11. The percentage difference increases with distance from the pivot pin 47. Accordingly, the threaded rod 74 is located on the bar 46 at a distance from the pivot pin 47 so as to permit movement of the contact finger 71 across an area representing a desired percentage range; for example, 5–40%.

When the foregoing device is assembled, it is calibrated by placing weights on the platform 11 and allowing the scale to come to equilibrium. The control lever 45 is then locked in position by actuating the solenoids 67, 68 to close the clamp members 65, 66 on shoes 49, 50, respectively. Thereafter, 10% additional weight is added to the platform and the contact finger 71 is adjusted until it just engages the contact strip 72. The position of the captive nut 73 is then marked and the nut is then run to the left end of the threaded rod 74. An additional percentage is added to the pan 11 and the preceding steps repeated until the scale is sufficiently calibrated.

Figure 3:
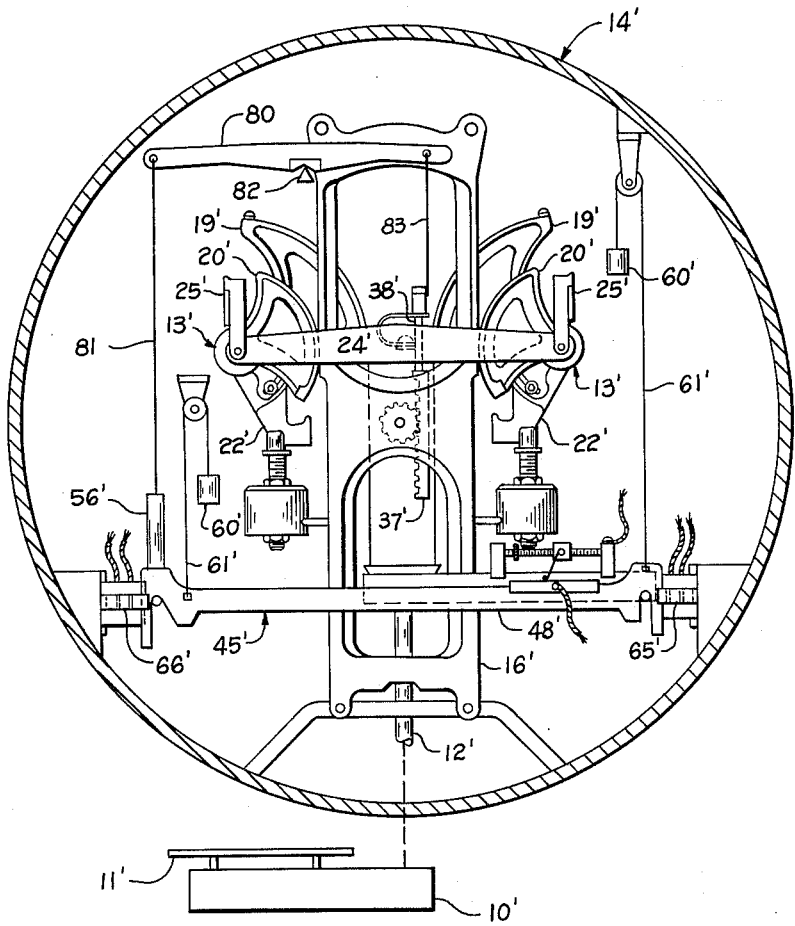
FIGURE 3 is an elevation view of a second embodiment of the present invention.

A second embodiment of the present invention is shown in FIGURE 3, wherein parts corresponding to those previously described are identified by like reference characters bearing a prime exponent. In this embodiment, the control lever generally 45′ and adjustable electrical contact equipment are the same as in the preferred embodiment. However, the left end of the control lever is supported by a different means. An overhead arm 80 is connected to the vertically free-hanging member 56′ by a short cord 81. The arm 80 is balanced upon a knife edge fulcrum 82 secured to the scale housing 14′, and is connected at the opposite end to the rack 37′ and rod 38′ by another short length of cord 83. This structure may be useful with scale mechanisms wherein insufficient room is available for the mounting of a sheave 58 as required in the preferred embodiment.

Figure 2:
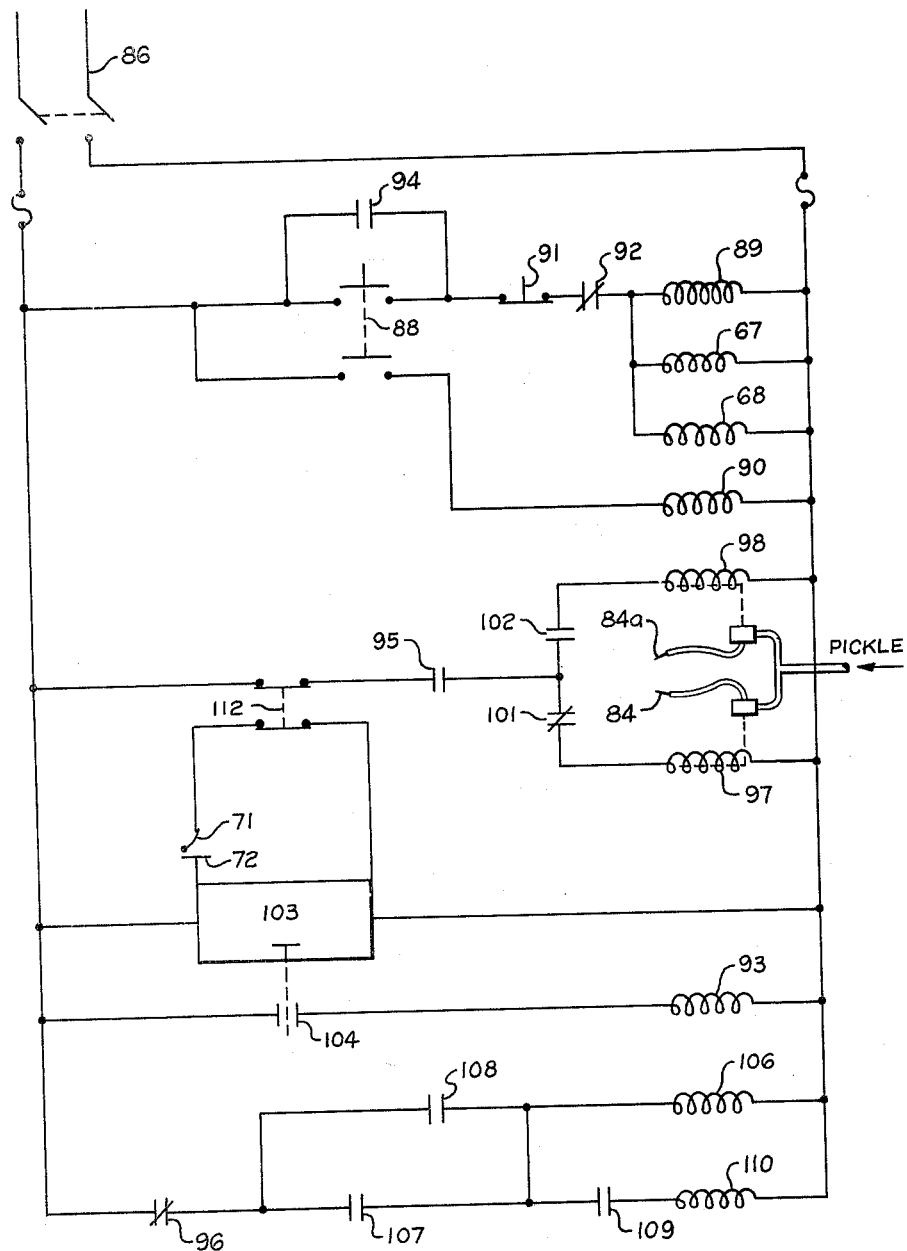
FIGURE 2 is a wiring diagram of the apparatus for controlling delivery of additional material.

Both embodiments of the present apparatus may be utilized to control the operation of pickle delivery means to a ham on the scale through the electrical circuit shown in FIGURE 2. The electrical circuit may be best understood in connection with the operation of the device. After the apparatus has been appropriately calibrated, operation is commenced by closing a switch 86 (FIGURE 2) connecting a source of electric power to the device, and a ham or the like is placed upon platform 11 (as shown in FIGURE 1) and a pickle injection needle 84 inserted in a vein in the butt end of the ham. The scale is allowed to come to equilibrium and the operator then manually closes a momentary contact 2-pole start switch 88 which closes two series circuits between the source of power and a pair of relays 89, 90. The circuit to relay 89 also includes, in series, a manual stop switch 91, which may be utilized at any time to interrupt the operation of the device, and a normally closed pair of relay contacts 92. The latter contacts are opened on the energization of a relay 93 to be subsequently explained.

The relay 89 actuates three pairs of relay contacts 94, 95, and 96. Contacts 94 are normally open, but provide, when actuated, a holding circuit around the starting switch. Contacts 95 are connected in series with the source of power and a pair of pickle valve solenoids 97, 98, one of which will be actuated to deliver pickle through the needle 84 to the ham on the scale platform 11.

Also connected across the source of power in parallel with the relay 89, and in series with a starting switch 88, are the solenoids 67, 68 which operate the clamp members 65, 66, respectively. Thus, when the manual starting switch is depressed, the control lever generally 45 will be locked in position and simultaneously pickle will be delivered to the item being weighed. These conditions will continue as long as the relay 89 remains energized.

At the same moment that the start switch 88 is depressed, the relay 90 is momentarily energized. This relay is of the sequence type which alternately opens one pair of contacts 101 and closes a second pair of contacts 102. These contacts are connected in series with the pickle valve solenoids 97, 98, respectively, forming two parallel circuits across the power supply. Thus, pickle fluid is available alternately through one or the other pickle valve each time the start switch 88 is actuated and consequently, two injection needles 84, 84a may be advantageously utilized to prepare a second item for injection while the first is undergoing treatment.

The electrical contact finger 71 and contact strip 72 are connected with an electrical means 103 that is also connected across the source of power. The electrical means 103 provides a stepdown voltage of a few volts across the contact finger 71 and contact strip 72, and includes a sensor relay (not shown). When the contact finger 71 engages strip 72 to complete a circuit, the sensor relay is actuated to close a pair of contacts 104 which are connected in series with the previously mentioned relay 93 and the source of power. Since the contacts 71 and contact strip 72 will be closed only upon the desired percentage of material being added to the scaled item, the relay 93 will not be energized until that time. However, when energized, the relay opens contacts 92 to deenergize relay 89 and break the holding circuit through contacts 94 and to disconnect the pickle valve solenoids through contacts 95. Energization of relay 93 and opening of contacts 92 also cause solenoids 67, 68 to be deenergized, releasing clamps 65, 66 and allowing the control lever 45 to descend.

The control circuit of FIGURE 2 also includes two additional features which are useful in the normal course of ham pumping. It is common procedure to apply a small additional quantity of pickle fluid to the shank end of the ham through a separate fluid delivery means, not shown. This is accomplished by actuation of an agastat relay 106. The latter relay is energized only upon the condition of relay 93 being energized to close a pair of contacts 107 and the relay 89 being deenergized so that its associated pair of contacts 96 will also be closed. Since this condition is only momentary, as the action of relay 93 results in release of the control lever 45 and breaking of the contact 71, 72, a holding circuit to the relay 106 is provided by a microswitch 108 mounted thereon. The agastat relay 106 acts to close a pair of contacts 109 for a timed interval which will connect the solenoid 110 of a "cushion shot" fluid delivery valve (not shown). At the end of the timed interval the relay 106 opens both sets of contacts 108 and 109.

It is also desirable in certain instances, where the butt end of a ham has been awkwardly cut, for an operator to be able to remove the injection needle from one vein of a ham and insert it in another vein. This is commonly known as "split-vein" pumping. To accomplish this, normally closed double-action switch 112 is placed in series with the pickle valve solenoids 97, 98 and the sensing contacts 71, 72. Accordingly, at any time during the pumping an operator may open the switch 112 which immobilizes the apparatus and closes the pickle valve while he removes the needle from one vein and places it in another. He thereafter recloses switch 112 and the operation continues until the desired percentage of pickle fluid has been added.

Obviously many modifications and variations of the invention as hereinbefore set forth may be made without departing from the spirit and scope thereof, and therefore only such limitations should be imposed as are indicated in the appended claims.

We claim:
1. In a scale apparatus for determining a percentage of the weight of a scaled item wherein the item is supported on a load bearing surface and a member connected thereto is moved a distance in a given direction in accordance with the weight of said item, the improvement comprising: a lever pivotally supported from a pivot point on said member; linkage means connected to an end of said lever spaced from said point, said linkage means indirectly connected to also be moved by said load bearing surface and being proportioned and arranged to move another point on said lever in said given direction a second distance greater than said given distance by a known amount whereby distances between said member and said lever, measured from predetermined respective points spaced from said pivot point, represent percentages of the weight of the item on the scale; and locking means engageable with said lever to hold only said lever in position after being so moved while said member is free to move further in said given direction upon the addition of further weight to said load bearing surface.

2. In a scale apparatus for determining a percentage of the weight of a scaled item wherein the item is supported on a load bearing surface and a member connected thereto is moved a distance in a given direction in accordance with the weight of said item, the improvement comprising: a lever pivotally supported from a pivot point on said member; linkage means connected to an end of said lever spaced from said point, said linkage means indirectly connected to also be moved by said load bearing surface and being proportioned and arranged to move another point on said lever in said given direction a second distance greater than said given distance by a known amount whereby distances between said member and said lever, measured from predetermined respective points spaced from said pivot point, represent percentages of the weight of the item on the scale; locking means engageable with said lever to hold only said lever in position after being so moved; and cooperative contact means on each of said member and said lever, said contact means being positioned and aligned so the distance therebetween when said lever is engaged by said locking means represents a desired percentage of the weight of said item and said contact means will be brought together upon the desired percentage weight being thereafter added to said item on said load bearing surface.

3. The improved apparatus of claim 2 wherein the scale apparatus includes a second member which moves a greater distance than said member connected to said bearing surface; and said linkage means includes a flexible cord connected between said second member and said end of said lever, said cord being trained about sheave means whereby said end of said lever will be moved in said given direction.

4. The improved apparatus of claim 2 wherein the scale apparatus includes a second member which moves a greater distance than said member connected to said bearing surface; and said linkage means includes an arm pivoted upon a fulcrum with the ends of said arm being connected, respectively, to said second member and said end of said lever.

5. An improved ham pumping control apparatus for use with liquid injecting equipment and a scale having a first member movable downwardly in proportion to the weight on the scale and a second member movable to a greater extent in proportion to said weight, said control apparatus comprising: an arm extending horizontally from said first member; a pivot pin secured to an end of said arm; a lever pivotally supported at one end upon said pin, said lever having a flat upper surface and having downwardly extending slots at each end substantially normal to and extending from the level of said surface, one of said slots being positioned upon said pin so that the lever normally moves therewith; linkage means connected between the opposite end of said lever at the other slot and said second member, said linkage means being arranged to move said opposite end of said lever through a greater distance in the same direction said pin is moved, whereby distances between said arm and said lever, measured from predetermined respective points spaced from said pivot pin represent percentages of the weight on the scale; locking means engageable with both ends of said lever to hold said lever in position after being so moved in accordance with the weight upon said scale; actuating means connected to said locking means; a pair of electrical contact means mounted in alignment on said arm and said lever, one of said pair being adjustable longitudinally of one of said arm and lever so that the percentage of the weight on said scale represented by the distance between said contacts may be adjusted; and electrical control means connected across said contacts and connected with said actuating means and the liquid injecting means to energize said actuating means and lock said lever and thereafter cause liquid to be injected into a ham on said scale until a weight of liquid, amounting to a desired percentage of the weight of said ham, is added to move said first member and arm through a distance to bring said pair of contacts together.

References Cited by the Examiner

UNITED STATES PATENTS

| | | | |
|---|---|---|---|
| 499,223 | 6/1893 | Gorringe | 177—120 |
| 1,821,087 | 9/1931 | Bryce | 177—219 |
| 2,812,705 | 11/1957 | Zellie | 99—256 |
| 2,833,506 | 5/1958 | Gunderson | 177—121 X |
| 3,101,042 | 8/1963 | Good | 99—256 |

FOREIGN PATENTS 341,326   11/1959   Switzerland.

References Cited by the Applicant

UNITED STATES PATENTS 1,614,726   1/1927   Gilbert.

WALTER A. SCHEEL, *Primary Examiner.*

JEROME SCHNALL, ROBERT E. PULFREY,
*Examiners.*